United States Patent
Hanai

(10) Patent No.: US 11,733,935 B2
(45) Date of Patent: Aug. 22, 2023

(54) INFORMATION PROCESSING APPARATUS, METHOD OF CONTROLLING INFORMATION PROCESSING APPARATUS, AND NON-TRANSITORY STORAGE MEDIUM

(71) Applicant: CANON KABUSHIKI KAISHA, Tokyo (JP)

(72) Inventor: Hiroaki Hanai, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/890,475

(22) Filed: Aug. 18, 2022

(65) Prior Publication Data
US 2023/0065899 A1  Mar. 2, 2023

(30) Foreign Application Priority Data
Aug. 31, 2021 (JP) .................................. 2021-140589

(51) Int. Cl.
*G06F 3/12* (2006.01)
*H04L 67/51* (2022.01)

(52) U.S. Cl.
CPC .......... *G06F 3/1204* (2013.01); *G06F 3/1225* (2013.01); *G06F 3/1254* (2013.01); *G06F 3/1287* (2013.01); *H04L 67/51* (2022.05)

(58) Field of Classification Search
None
See application file for complete search history.

(56) References Cited

U.S. PATENT DOCUMENTS

2021/0055897 A1  2/2021  Tomihisa

FOREIGN PATENT DOCUMENTS

JP  2021043717 A  3/2021

OTHER PUBLICATIONS

Extended European Search Report issued in European Appln. No. 22191598.6 dated Jan. 17, 2023.
Dinita. "How to Print Directly from Microsoft Teams" Feb. 28, 2021. pp. 1-12. https://www.technipages.com/how-to-print-directly-from-microsoft-teams. Cited in NPL 1.

*Primary Examiner* — Lennin R Rodriguezgonzalez
(74) *Attorney, Agent, or Firm* — Rossi, Kimms & McDowell LLP

(57) ABSTRACT

According to one aspect of the present disclosure, an information processing apparatus configured to: transmit a posting; display the transmitted posting; display information of data linked to other posting as responses to the transmitted posting; receive a user operation to specify a print function through an object displayed in association with the transmitted posting; display information of the data linked to the other posting associated with the posting as selectable data to be printed; and transmit a print instruction based on information of the displayed data that is selected through a user operation.

17 Claims, 20 Drawing Sheets

FIG. 4A

```
SETTING/REGISTRATION
─────────────────────────────────────────────
CONFIGURATION         SETTING OF CLOUD PRINT SERVICE
   SHEET SETTING       ┌─ BASIC SETTING ──────────────────┐
   TIMER/POWER         │  ┌902                            │
901  SETTING           │  ☑  USE CLOUD PRINT              │
   NETWORK             │                                  │
   EXTERNAL            │     ☑  VERIFY SERVER CERTIFICATE │
   INTERFACE           │                                  │
   LANGUAGE            │     ☑  ADD CN TO VERIFIED ITEMS  │
   SETTING             │                              ┌903│
                       │  PRINTER NAME: [Sample Printer]  │
ADJUSTMENT/            │                                  │
MAINTENANCE            │  AAD AUTHENTICATION URL: [    ]  │
   IMAGE QUALITY       └──────────────────────────────────┘
   ADJUSTMENT
```

FIG. 4B

```
SETTING/REGISTRATION
─────────────────────────────────────────────
CONFIGURATION         INFORMATION FOR REGISTRATION
   SHEET SETTING       ┌─ INFORMATION FOR REGISTRATION ───┐
   TIMER/POWER         │  URL FOR REGISTRATION: https://AAA.com/devicelogin ─904
   SETTING             │
   NETWORK             │  CODE FOR REGISTRATION:  xxxxxxxx ─905
   EXTERNAL            │
   INTERFACE           │
   LANGUAGE            │
   SETTING             │
                       │
ADJUSTMENT/            │
MAINTENANCE            │
   IMAGE QUALITY       │
   ADJUSTMENT          └──────────────────────────────────┘
```

FIG. 4C

906
INPUT CODE

_____

NEXT

907
SELECT ACCOUNT (A) AAA
    aaa@mail.~

(+) USE ANOTHER ACCOUNT

RETURN

908
REQUESTED ACCESS PERMISSION

CANCEL  APPROVE

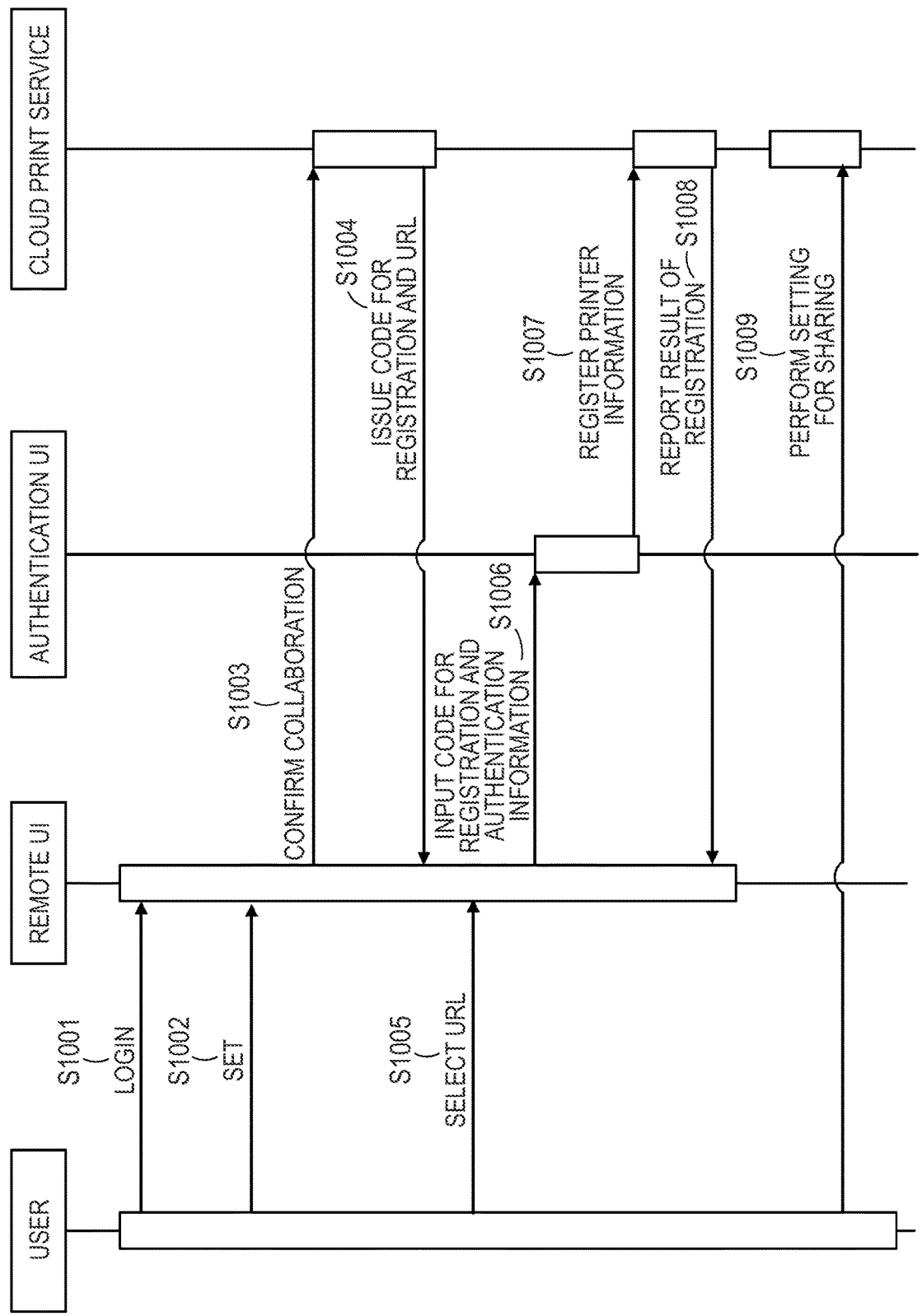

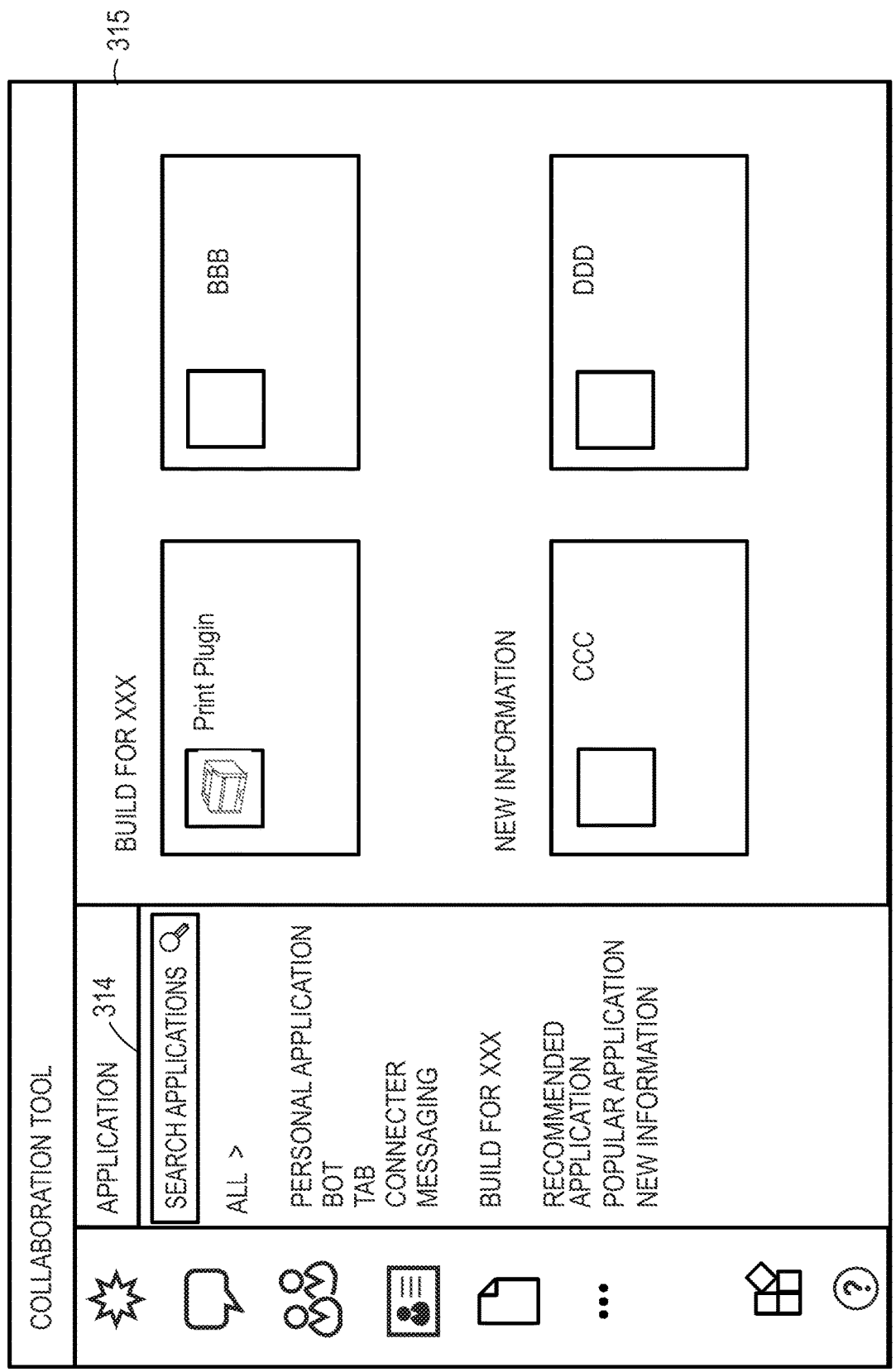

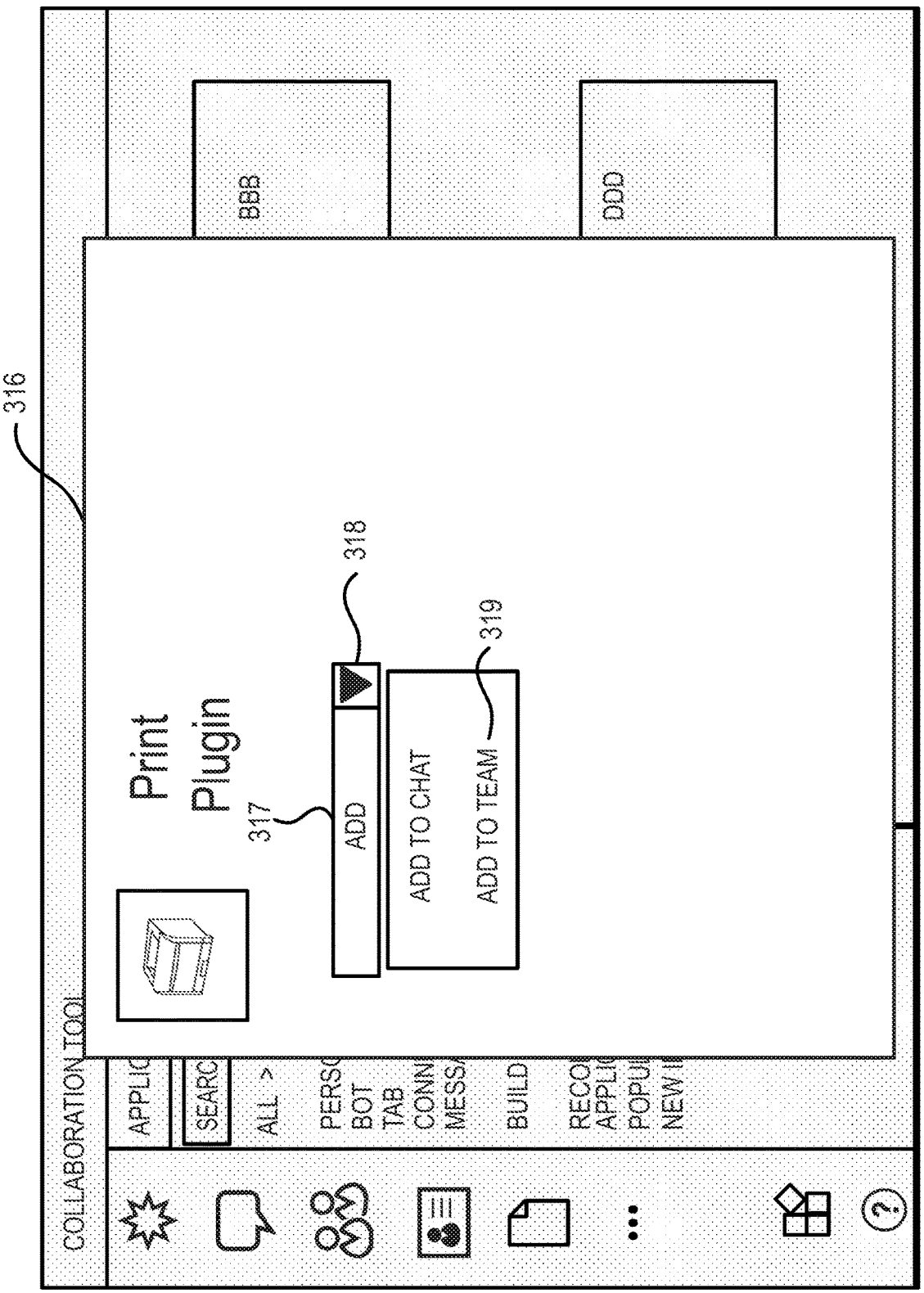

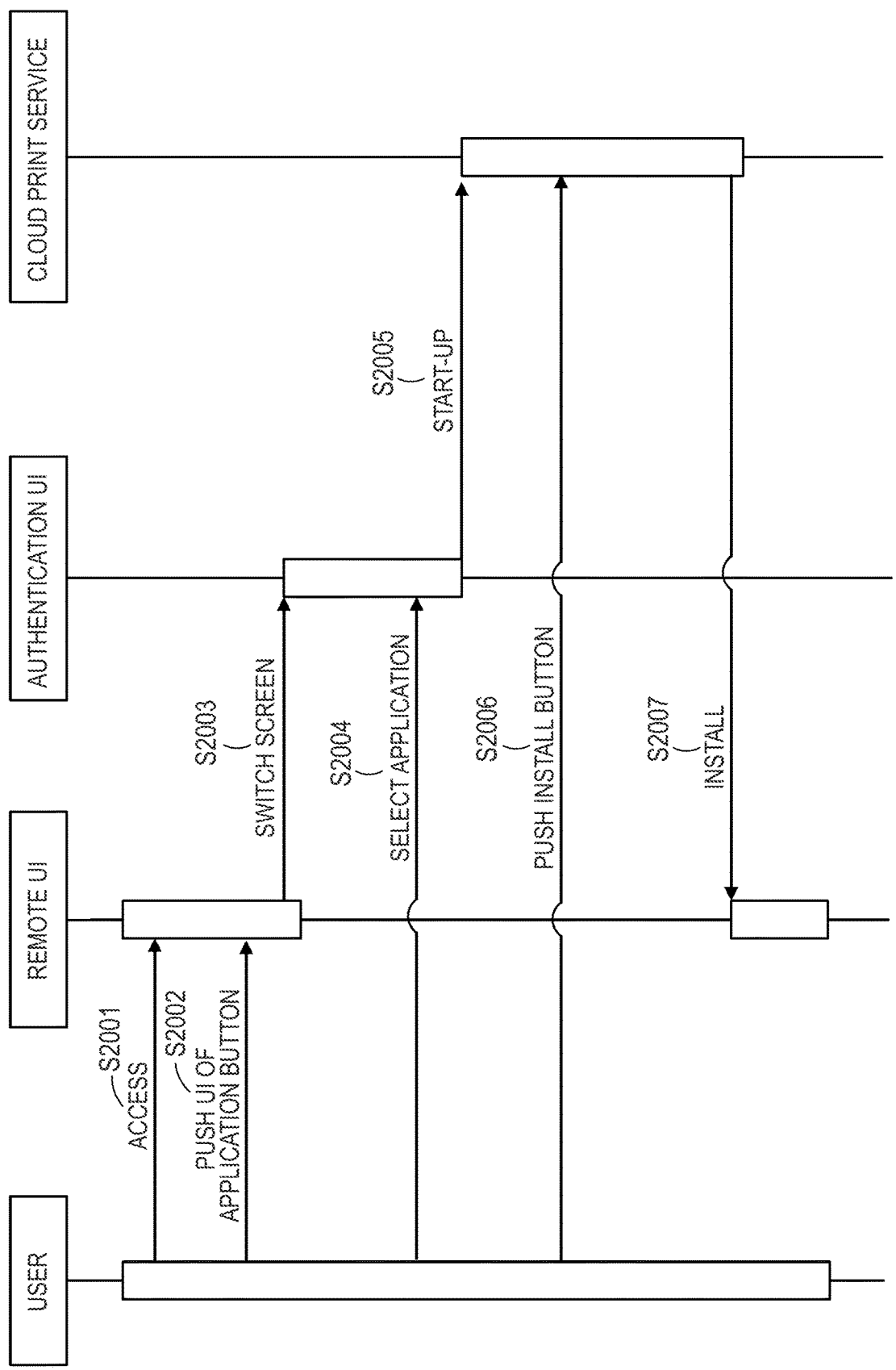

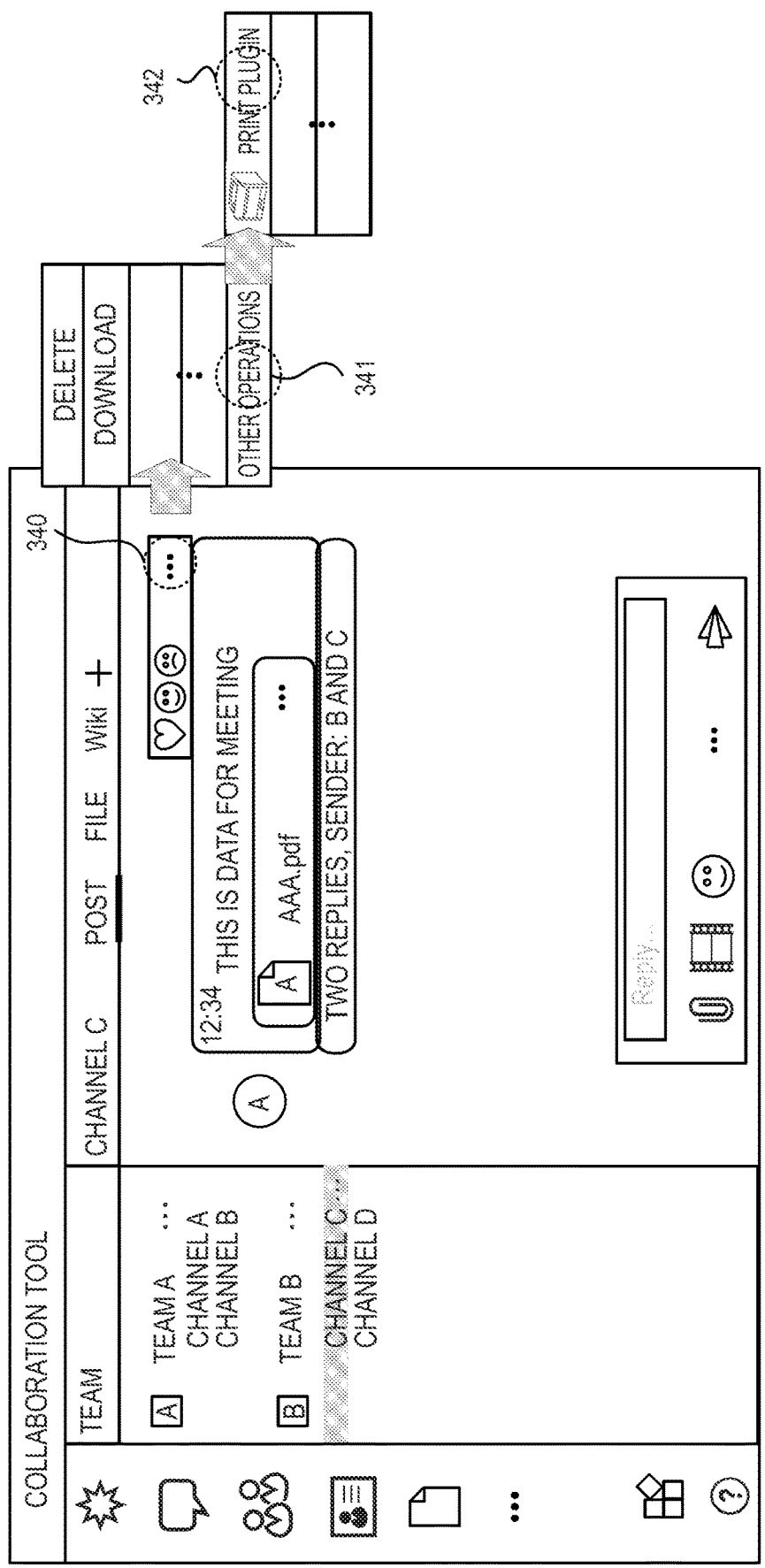

FIG. 11A

| CATEGORY | ATTRIBUTES | VALUES |
|---|---|---|
| FILE ATTRIBUTES | FILE NAME | Report.pptx |
| | AUTHOR | Luis |
| | SIZE | 1.23 Mb |
| | UPDATED DATE AND TIME | 2020/1/23 12:34 |
| SETTING FOR SHARING | SHARED TO | ALL USERS |
| ACCESS AUTHORITY | READ | ○ |
| | DOWNLOAD | × |
| | WRITE | × |
| | PRINT | ○ |

FIG. 11B

| PRINTER NAME | PRINTER ID | USER | STATUS OF PRINTER | NUMBER OF JOBS | STATUS OF SHARING | NAME OF SHARING |
|---|---|---|---|---|---|---|
| Printer A | xxxxxxxx-yyyy-zzzz-aaaa-bbbbbbbbbbbb | Luis | active | 1 | share | home-printer |
| Printer B | ... | Luis | sleep | 0 | forbid | office-printer |
| Printer C | ... | Daniela | active | 2 | forbid | default-Printer |
| Printer D | ... | Daniela | ... | ... | ... | ... |
| Printer E | ... | Joe | ... | ... | ... | ... |
| Printer F | ... | Joe | ... | ... | ... | ... |
| Printer G | ... | Michael | ... | ... | ... | ... |

FIG. 11C

| PARAMETER | | VALUES |
|---|---|---|
| id | | "aaaaaaaaaaaa" |
| replyToId | | "bbbbbbbbbbbb" |
| etag | | "aaaaaaaaaaaa" |
| messageType | | "message" |
| createdDateTime | | "2021-04-14T05:54:55.835Z" |
| echatIdtag | | "19:3xxxxxxxx@thread.tacv2" |
| importance | | "normal" |
| locale | | "en-us" |
| from | user_id | "bcccccccd-cb48-b8a7" |
| | user_displayName | "AAA" |
| | user_userIdentityType | "aadUser" |
| attachments | id | "bdddddde-df7d-457d" |
| | contentType | "reference" |
| | contentUrl | https://AAAA |
| | content | null |
| | name | "test.pdf" |
| mentions | | null |
| reactions | | null |

INFORMATION PROCESSING APPARATUS, METHOD OF CONTROLLING INFORMATION PROCESSING APPARATUS, AND NON-TRANSITORY STORAGE MEDIUM

BACKGROUND

Field

The present invention relates to an information processing apparatus, a method of controlling the information processing apparatus, and a non-transitory storage medium to perform printing from a collaboration tool.

Description of the Related Art

The collaboration tools such as Microsoft Teams (registered trademark), Skype registered trademark) and Slack (registered trademark) are known.

File sharing in the collaboration tool is performed, for example, as follows.

First, a file owner posts a message with a file stored in a shared server or a local device. The file is uploaded to a system. Then, another user browses, edits, and downloads the uploaded file through a file list screen or the message.

If a shared file is to be printed, there are two methods, one is a method in which each user uses a printer driver for a specific printer to perform printing, and the other is a method in which a plug-in (print plug-in) having a printing function performs printing via a cloud print service as disclosed in Japanese Patent Application Laid-Open No. 2021-43717.

According to the latter printing method, if a print bot or the like detects a printing action on the collaboration tool, a print job is submitted to a virtual queue of an image forming apparatus registered in advance to a tenant on the cloud print service. The image forming apparatus acquires the print job from the virtual queue of the cloud print service and outputs the file.

For example, Microsoft Universal Print (registered trademark) and uniFLOW Online (registered trademark) are representative examples of the cloud print services to be linked with the printing plug-ins.

If the printing is performed from the current collaboration tool, there is no way to call a plug-in from the list of shared files. Thus, the print plug-in must be called from the three-dot leader of the message with the file attached.

However, in case of printing a file from a message shared in a thread, it is necessary to expand a thread once closed, search for the message, and call a print plug-in for each message, which would require time and efforts of users.

The present invention has been made to solve the above problem. The present invention provides a mechanism for easily selecting and printing a file shared on the collaboration tool.

SUMMARY

According to an aspect of the present disclosure, an information processing apparatus comprises: a transmitting unit that transmits a posting; a first displaying unit that displays the transmitted posting and information of data linked to other posting as responses to the transmitted posting; a receiving unit that receives a user operation to specify a print function through an object displayed in association with the transmitted posting; a second displaying unit that displays information of the data linked to the other posting associated with the posting as selectable data to be printed; and a transmitting unit that transmits a print instruction based on information of the displayed data that is selected through a user operation.

Further features of the present invention will become apparent from the following description of exemplary embodiments with reference to the attached drawings.

BRIEF DESCRIPTION OF THE DRAWINGS

FIG. 4A shows an example of the printer registration screen to the cloud print service using the remote UI.

FIG. 4B shows an example of the printer registration screen to the cloud print service using the remote UI.

FIG. 4C shows an example of the printer registration screen to the cloud print service using the remote UI.

FIG. 5 shows an example of the registration sequence to the cloud print service.

FIG. 6B is an example of the screen showing a list of plugins according to the embodiment of the present disclosure.

FIG. 6C is an example of the installation UI of the plugins according to the embodiment of the present disclosure.

FIG. 7 shows a sequence diagram describing the installation of the plugins according to the embodiment of the present disclosure.

FIG. 9A shows an example of a UI when calling out the print plugin from the top message of a thread.

FIG. 11A is a diagram describing the information managed in the cloud storage and could print service.

FIG. 11B is a diagram describing the information managed in the print plugin.

FIG. 11C shows an example of message information managed in the collaboration tool 300.

DESCRIPTION OF THE EMBODIMENTS

The embodiments of the present invention will now be described with reference to the drawings.

Figure 1:
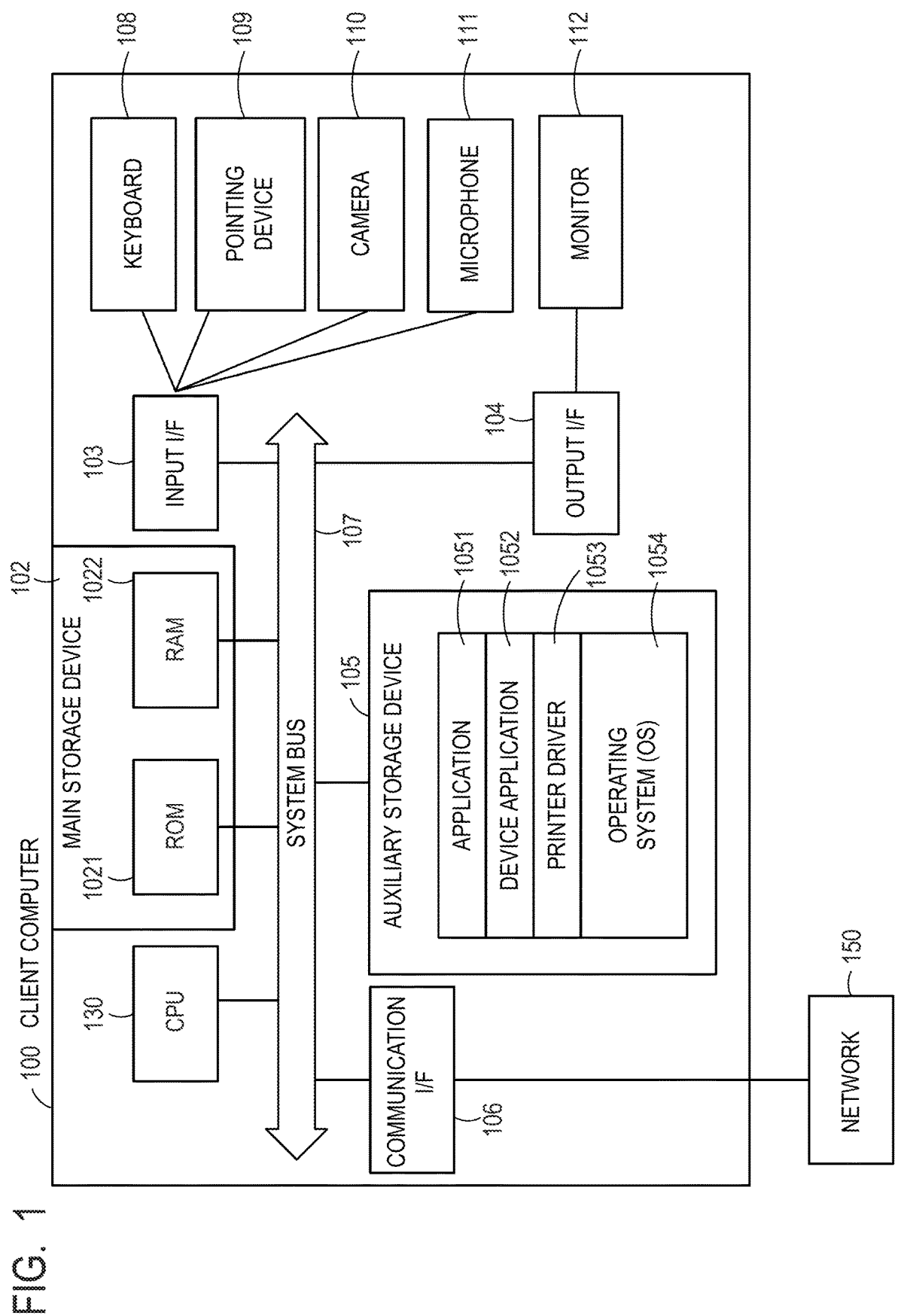
FIG. 1 is a diagram showing the hardware configuration of the client computer.

FIG. 1 is a diagram showing the hardware configuration of a general computer (information processing apparatus) showing the embodiment of the present invention. It should be noted that the present invention can be applied to a single function, a system comprising multiple devices, or a system connected via a network to perform processing.

A client computer 100 comprises a system shown in FIG. 1. Detailed descriptions are provided below.

A CPU 130 controls the entire device according to a program stored in a ROM 1021 or a RAM 1022 of a main storage device 102 or an auxiliary storage device 105.

The RAM 1022 is also used as a work area if the CPU 130 performs various processes. The auxiliary storage device 105 records an operating system (OS) 1054, an application 1051, a device application 1052, a printer driver 1053, and the like. In the following descriptions, the main storage device 102 and the auxiliary storage device 105 are collectively referred to as "storage devices".

Input devices such as a keyboard 108 and a pointing device 109, which are represented by a mouse and a touch panel, are connected through an input I/F 103. The keyboard 108 and the pointing device 109 are devices for a user to give various instructions to the client computer 100. Input devices such as a camera 110 and a microphone 111 are also connected through the input I/F 103. As for the camera 110 and the microphone 111, the client computer 100 may have a photographing function and a sound collecting function.

An output I/F 104 is an interface for outputting data to the outside, and outputs data to an output device such as a monitor 112.

A communication I/F 106 is used to connect the client computer 100 to each external system via a network 150.

A common data system bus 107 is used to exchange data between interfaces and modules. In addition, the CPU 130 executes processing based on a program stored in the storage devices, thereby realizing the processing according to the present embodiment.

Figure 2:
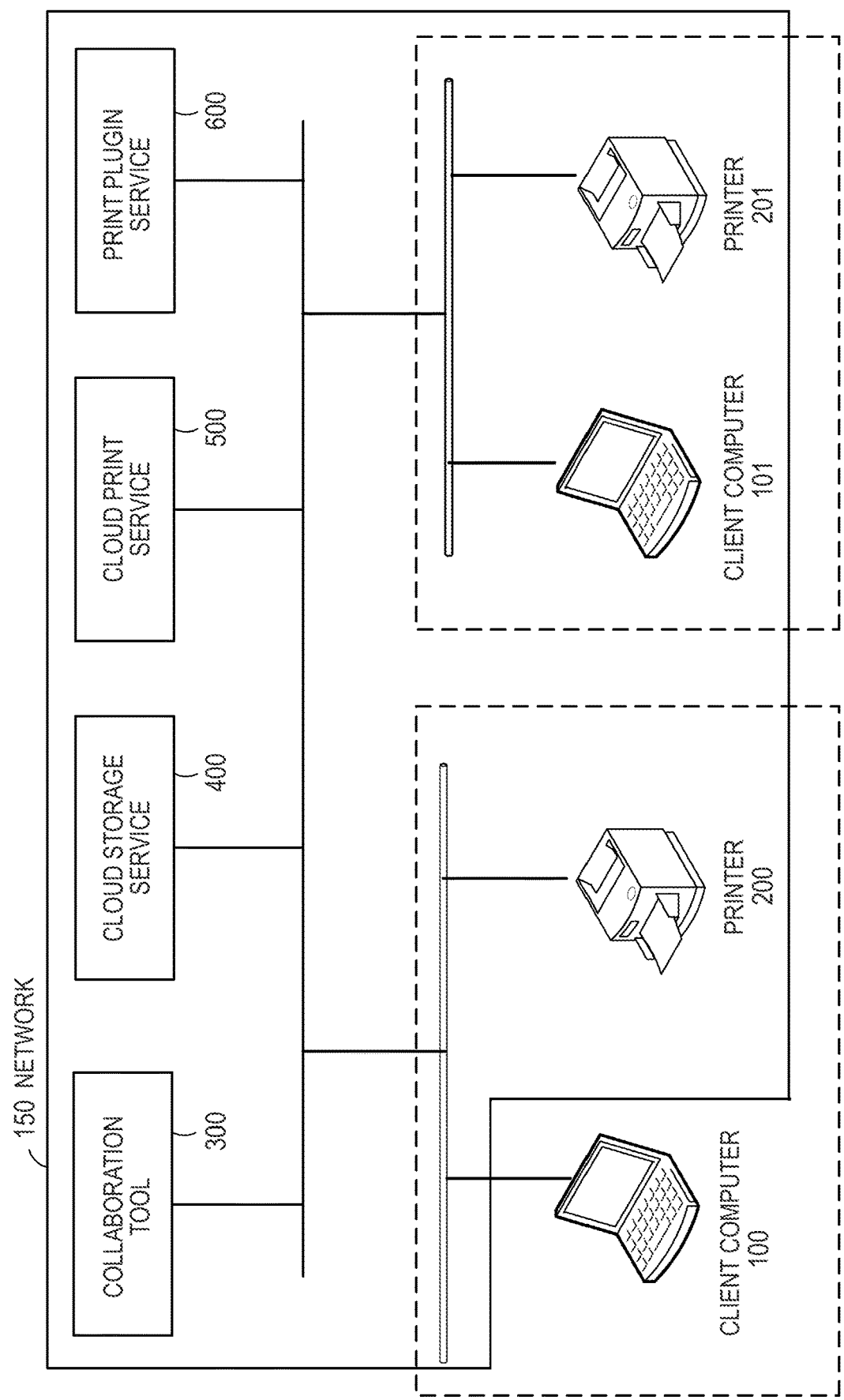
FIG. 2 is a diagram showing the network configuration according to the embodiment of the present disclosure.

FIG. 2 is a diagram showing an example of the configuration of the system according to an embodiment of the present invention.

The client computer 100 and a printer 200 are connected to the network 150, located in the same intranet, and are in a communicable state. A client computer 101 and a printer 201 located in another intranet and are connected to the Internet.

A collaboration tool 300, a cloud storage service 400, a cloud print service 500, and a print plug-in service 600 are connected to the network 150.

The collaboration tool 300 is a tool such as an online meeting service. The collaboration tool 300 is accessed from an application running on the client computer 100 or a Web browser running on the client computer 100 and is operated on the Web browser. In the collaboration tool 300, accounts are managed using a user ID and a password for the collaboration tool, and the users can access the collaboration tool 300 by using these accounts. The collaboration tool 300 provides online video communication and online chat meeting services, and users who do not have accounts are temporarily can uses these services if invited. The collaboration tool also provides a file sharing service/function for sharing data uploaded by the user to a server used for the services with other users.

The cloud storage service 400 is a storage service built on the cloud in the Internet which is a server system consisting of multiple servers (that is, the cloud storage service 400 is built on the server system). The cloud storage service 400 can be connected to the respective intranets described above, and can be accessed from the client computers 100, 101 via the Internet using the IDs and passwords for the cloud storage. The users can upload the file data on the cloud storage service 400, or download the file data from the cloud storage service 400. The file data uploaded on the cloud storage service 400 can be shared with other users, and the users can set restrictions on the shared file. For example, browsing, editing and downloading can be restricted for each user or group depending on the settings.

The cloud print service 500 is a cloud print service built on a cloud in the Internet which is a server system consisting of multiple servers (that is, the cloud print service 500 is built on the server system). The cloud print service 500 may be connected to the respective intranets described above, and may also be connected to the client computer 100 and the printer 200, the client computer 101, and the printer 201 through the Internet. In the cloud print service 500, accounts are managed using the user IDs and passwords for the cloud print service, and the users can access the cloud print service 500 by using these accounts.

The print plug-in service 600 can be linked with the cloud storage service 400 and the cloud print service 500 online and provides a printing function to the collaboration tool 300. If the print plug-in is installed on the collaboration tool 300, some user interfaces such as a file selection UI and a print UI are added to the interface of the collaboration tool 300. If the user operates the added print UI, an instruction is transmitted to the print plug-in service 600 to cause the plug-in service 600 to execute a printing process or the like via the cloud print service 500. At this time, the print plug-in service 600 acquires message information from the collaboration tool 300 and file information from the cloud storage service 400.

If accessing the collaboration tool 300, the cloud storage service 400, and the cloud print service 500, the respective services can be accessed by the account for the collaboration tool 300 through the single sign-on technique.

Figure 3:
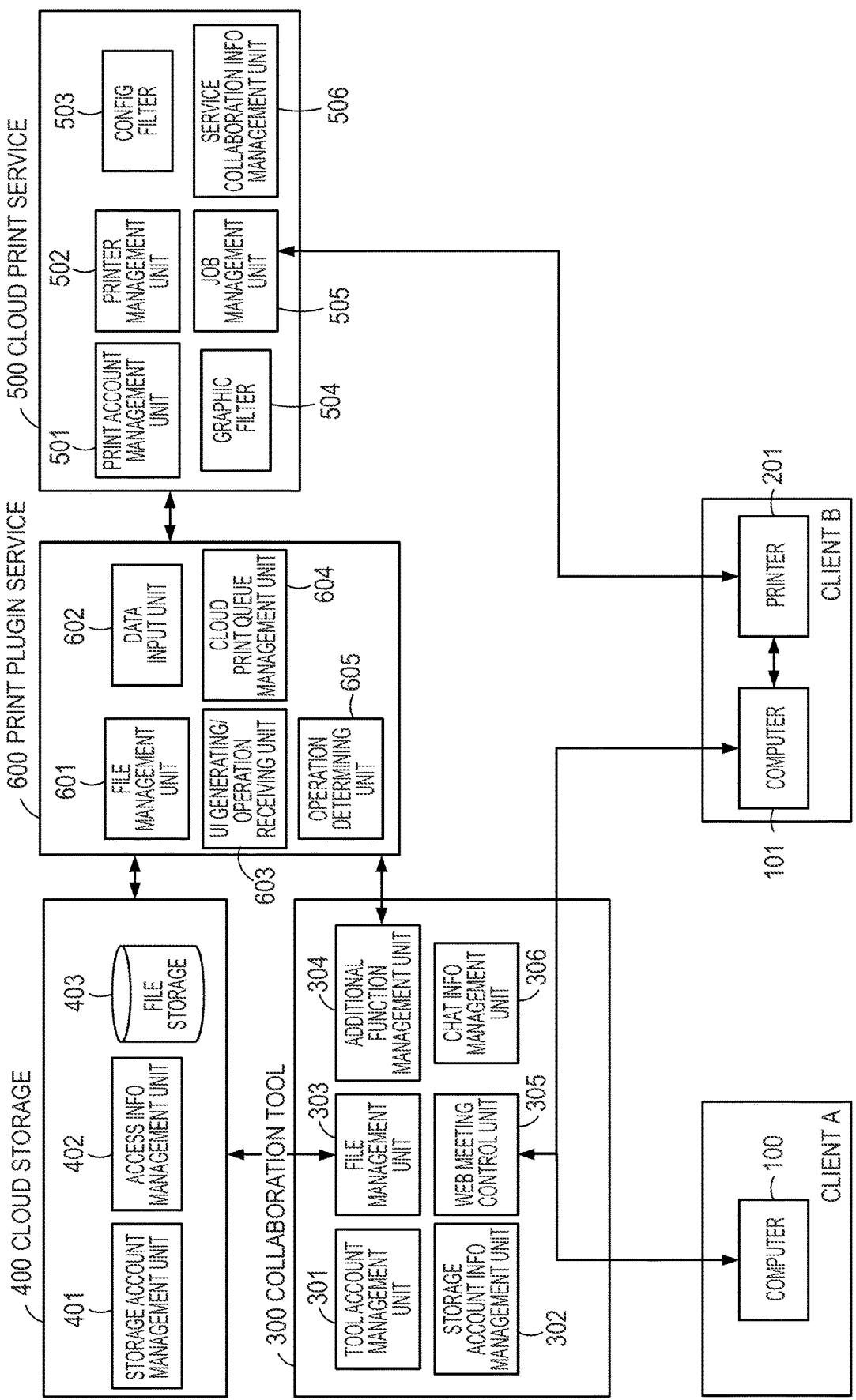
FIG. 3 shows a diagram describing the functions of the entire printing system according to the embodiment of the present disclosure.

FIG. 3 is a functional block diagram describing the functions of printing through the collaboration tool 300 of the present embodiment.

The collaboration tool 300 provides services including a business chat service and a video call service through the Internet, and various functions can be added. According to the present embodiment, the collaboration tool 300 provides functions of the tool account management unit 301, the storage account information management unit 302, the file management unit 303, the additional function management unit 304, the web conference control unit 305, and the chat information management unit 306. These functions and the operation of the collaboration tool 300 described later are realized by the CPU of one or more computers mounting the collaboration tool 300 through a program stored in the storage devices read and executed by the CPU.

A tool account management unit 301 manages user information (IDs, passwords, and other settings) registered in the collaboration tool 300 by the user. The tool account management unit 301 is used for confirming the consistency of information inputted when the user logs in to the collaboration tool 300, and updates the internal information if the setting is changed by the user.

The storage account information management unit 302 manages account information used for accessing the cloud storage service 400 from the collaboration tool 300.

The file management unit 303 manages access information for the cloud storage service 400 itself or files in the cloud storage service 400, and changes and manages the access information for each user or group. The file management unit 303 also manages access information for the file storage held by the collaboration tool 300.

The additional function management unit 304 displays applications installable in the collaboration tool 300, receives instructions for the installation, and manages installed applications. The additional function management unit 304 adds items of the applications installed on the Web meeting system, and calls necessary functions. The additional function management unit 304 may manage access information of the cloud print service 500 to which the print plug-in service 600 connected (URL, etc.), information of users registered in the cloud print service 500, printer queue information, etc. The additional function management unit 304 may manage user information (IDs and passwords) used when connected to the cloud print service 500.

The Web conference control unit 305 provides a chat service, a screen sharing function, and a function of switching I/Fs during a Web meeting.

The chat information management unit 306 manages a history of chat contents and group information. If receiving an inquiry from the print plug-in service 600, The chat information management unit 306 transmits a specified chat, file information, group information, a selection status, etc.

The cloud storage service 400 is a service for storing and sharing files stored in the cloud. According to the present embodiment, the cloud storage service 400 includes functions of a storage account management unit 401, an access information management unit 402, and a file storage 403. These functions and the operation of the cloud storage service 400 described later are realized by the CPU of one or more computers mounting the cloud storage service 400 through a program stored in the storage devices read and executed by the CPU.

The storage account management unit 401 manages user information (information such as IDs, passwords, and permissions) registered in the cloud storage service 400. The storage account management unit 401 is used to confirm the consistency of information input when the user logs in to the cloud storage service 400, and updates the internal information if the setting is changed by the user.

The access information management unit 402 can set the access authority of other users and services to the cloud storage service 400. The access information management unit 402 sets the right of access (access authority/permission) to users accessing files stored in the file storage 403 and issues URLs to be shared.

The file storage 403 stores files uploaded by the user to the cloud storage service 400.

The cloud print service 500 is a service present in the cloud through the Internet and can provide functions related to printing. According to the present embodiment, the cloud print service 500 includes functions of a print account management unit 501, a printer management unit 502, a configuration filter 503, a graphic filter 504, a job management unit 505, and a service collaboration information management unit 506. These functions may be comprised by another cloud print service that collaborates with the cloud print service 500. These functions and the operation of the cloud print service 500 described later are realized by the CPU of one or more computers mounting the cloud print service 500 through a program stored in the storage devices read and executed by the CPU.

The print account management unit 501 manages information related to the user registered in the cloud print service 500 (e.g., IDs, passwords, group to which the user belongs, tenant information, and permissions). The print account management unit 501 is used for confirming the consistency of information inputted when the user logs in to the cloud print service 500, and updates the internal information if the setting is changed by the user. the group information and tenant information managed by the print account management unit 501 are used when the print plug-in service 600 acquires printer queue information or the like.

The printer management unit 502 generates and registers a printer queue if an instruction for registering a printer is given from a device corresponding to the cloud print service 500 or from a virtual device application installed in the client terminal. The registered printer queue is associated with information of printer identification, and attributes such as a location of the printer are added and managed. The printer management unit 502 creates a list of printer information based on user information or the like in the printer queue registered in a group or a tenant to which the user belongs.

The configuration filter 503 shapes the print job based on detailed setting data received by the cloud print service 500. The graphic filter 504 converts the print job into a proper format.

The print job management unit 505 manages the print job received from the print plug-in service 600. The received job is once stored in a virtual printer queue (storage area). The job is copied to the corresponding printer queue according to the output destination information received from the print plug-in service 600, and the print job is sent to the corresponding printer. Alternatively, the print job management unit 505 converts the print job waiting in the virtual printer queue (storage area) into a proper format by using the configuration filter 503 or the graphic filter 504, copies the converted print job to the corresponding printer queue, and sends the print job. The print job management unit 505 also manages used print object data, detailed setting data, and other formal information (e.g., file names, printed date, etc.).

The service collaboration information management unit 506 manages information of another cloud print service collaborating with the cloud print service 500.

The print plug-in service 600 provides printing functions to the collaboration tool 300 to perform printing via the cloud print service 500. According to the present embodiment, the print plug-in service 600 includes functions of a file management unit 601, a data input unit 602, a UI generating/operation receiving unit 603, a cloud print queue management unit 604, and an operation determining unit 605. These functions and the operation of the print plug-in service 600 described later are realized by the CPU of one or more computers mounting the print plug-in service 600 through a program stored in the storage devices read and executed by the CPU.

The file management unit 601 acquires, from the cloud storage service 400, a target file to be printed according to an instruction through the print UI displayed in the collaboration tool 300.

The data input unit 602 sends to the cloud print service 500 information of detailed setting data, user information, printer queue information received through the print UI, and the file acquired from the cloud storage service 400.

The UI generating/operation receiving unit 603 displays the print UI (user interface) on the collaboration tool 300. The UI generating/operation receiving unit 603 displays an interface related to printer queues and file information (file names, file holders, etc.) acquired from a cloud print service 500. The UI generating/operation receiving unit 603 receives detailed setting by users, printer queues and files selected. The UI generating/operation receiving unit 603 displays a UI for collaborating with the cloud print service 500 and receives information for the collaboration including user information (IDs and passwords).

The cloud print queue management unit 604 receives user information and printer queue information registered in the linked cloud print service 500.

The operation determining unit 605 determines a source (place) of a calling (caller) and switches the operations. For example, if the operation determining unit 605 determines that the print plug-in 600 is called from the three-dot leader of a message, the operation determining unit 605 determines a position of the message in the thread based on the message information received from the chat information management unit 306, and acquires information of files attached to the related message. If the operation determining unit 605 determines that the file is called from the three-dot leader of the file, the operation determining unit 605 acquires the file information of the caller. The operation determining unit 605 may collectively acquire related files based on information such as group information indicating information of the group for which the file is shared and information indicating whether another file is selected or not.

Hereinafter, details of the present embodiment will be described.

First, the process of registering printers to the cloud print service is described.

FIGS. 4A to 4C show an example of a screen used for registering printers to the cloud print service using a remote UI.

FIG. 5 is a sequence diagram showing an example of registering printers to the cloud print service.

A user accesses (logs in) the remote UI of a printer (e.g., the printer 200) to be registered through a client computer (e.g., the client computer 100), and selects a network setting (e.g., the network setting 901 in FIG. 4A) (step S1001). As a result, a setting screen is displayed on the remote UI in which basic settings and registration information of the cloud print service 500 can be selected. If the user selects the basic setting on the setting screen, the basic setting screen of FIG. 4A including a UI 902 for confirming whether to use the cloud print service and a UI 903 for inputting a printer name when registering the cloud print service is displayed on the remote UI.

If the user put a check in the UI 902 and inputs a printer name in the UI 903 (step S1002), the printer sends an inquiry to the cloud print service 500 (step S1003). In response to this inquiry, the cloud print service 500 issues a registration URL 904 and a registration code 905 as shown in FIG. 4B (step S1004).

If the user selects registration information of the network setting 901, FIG. 4B is displayed. If the registration URL 904 is selected (step S1005), the authentication UIs 906 to 908 of FIG. 4C is displayed in order.

A code input UI 906 of FIG. 4C receives an input of the registration code 905 from the user, and a UI 907 receives the account information of the cloud print service as an authentication process. If the "approval" is detected in a UI 908, the access permission is given, and the authentication process ends (step S1006). If the authentication is completed, the printer is registered in the cloud print service 500 (step S1007), and that result is transmitted to the remote UI (step S1008).

The printer registration in the cloud print service is completed by the above operations.

Thereafter, in consideration of communications with the print plug-in service 600, the user accesses the cloud print service 500 to perform setting for the sharing (step S1009).

For the printer registration, a locally installed printer queue may be registered from an application for the registration.

Next, descriptions will be given of the method of installing an application to the collaboration tool 300 using the print plug-in as an example. As shown in FIG. 3, the collaboration tool 300 provides a conversation service such as video communications and a chat function. The collaboration tool 300 is a system in which functions can be added and expanded by collaborating with the cloud storage service 400 and by installing other applications, and some UIs such as buttons corresponding to the functions are provided.

Installation of Plugins

Figure 6A:
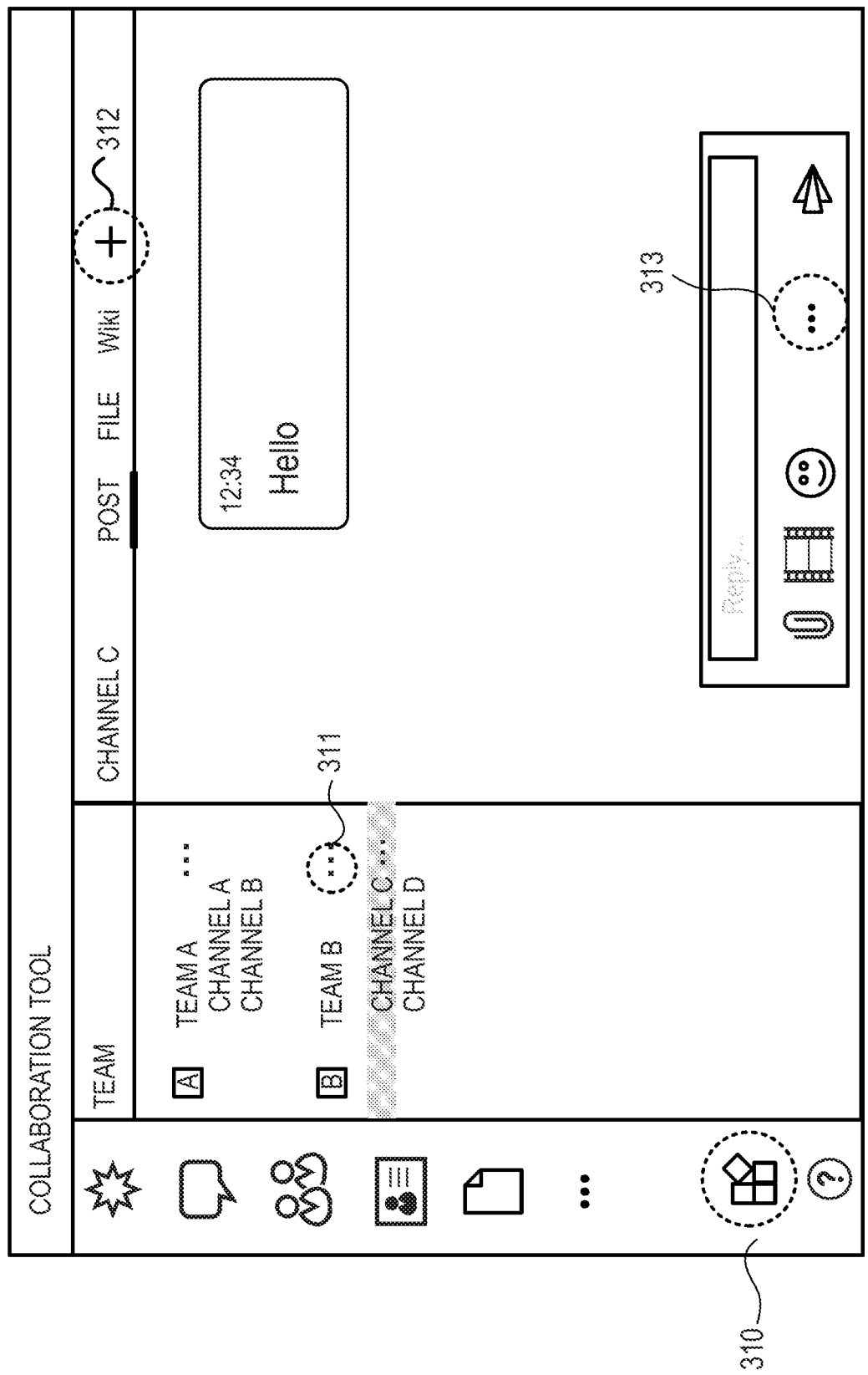
FIG. 6A is an example of the basic screen of the collaboration tool according to the embodiment of the present disclosure.

FIG. 6A shows an example of a screen used in the collaboration tool.

Built-in function buttons are pinned and displayed in an application bar of the collaboration tool 300, and a plug-in can be selected and installed for an individual or a team from an application button 310.

An example of adding a plugin for an individual is described with reference to the installation sequence of FIG. 7.

FIG. 7 is a sequence diagram describing the installation of a plug-in according to the present embodiment.

If the user accesses the collaboration tool screen (step S2001) and selects the application button 310 (step S2002), the collaboration tool 300 displays a screen including a list (FIG. 6B) of applications installable on the collaboration tool 300 (step S2003).

In a UI 314 showing the screen of the application list, the user can select the classification of the applications, and the filtered applications are displayed in a UI 315 according to the selection by the user. If the user selects the Print Plugin (step S2004), an installation UI 316 shown in FIG. 6C pops up (S2005). In the installation UI 316, if the user selects an "add" button 317 (step S2006), the collaboration tool 300 installs the print plug-in 600 in the chat function (step S2007).

Figure 6D:
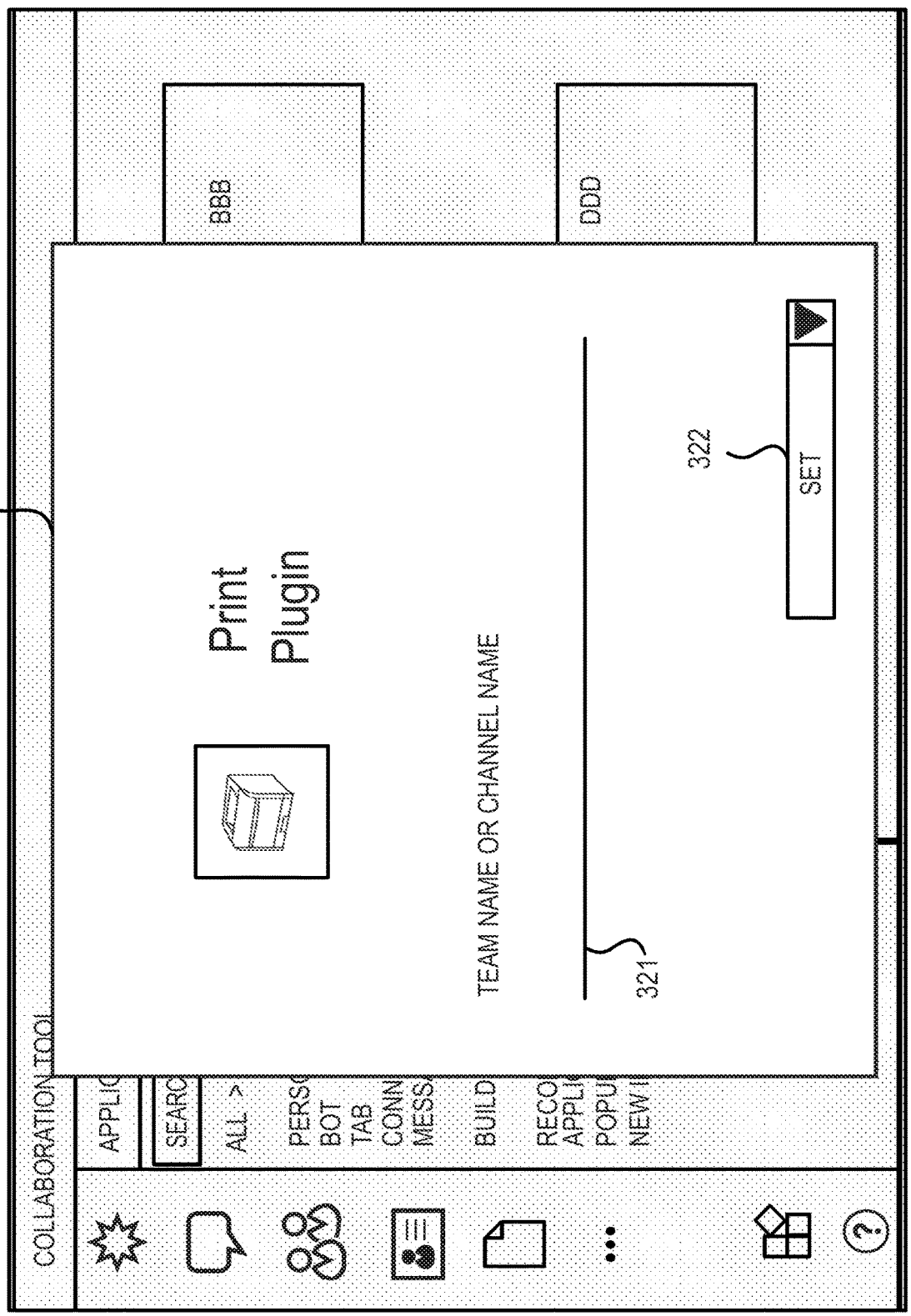
FIG. 6D is an example of the installation UI of the plugins to a team according to the embodiment of the present disclosure.

If adding the print plug-in to the team, the user selects "Add to Team" 319 from a list 318 in the installation UI 316. If the collaboration tool 300 detects that the "Add to Team" 319 is selected, the collaboration tool 300 displays a pop-up 320 shown in FIG. 6D. Further, the collaboration tool 300 installs the print plug-in to the team if a press of a setting button 322 is detected after a team or a channel name to which the plug-in is to be installed is inputted in an input field 321 of the pop-up 320.

The print plug-in may be installed from various places in the collaboration tool 300. For example, the user can install the print plug-in through a team management button 311, a tab 312, a UI 313 for posting a message, etc. shown in FIG. 6A.

If installing the print plug-in to the collaboration tool 300 is completed, an icon indicating the print plug-in is displayed for the source (place) of the calling according to the setting in the application. Users who want to perform printing from the collaboration tool 300 can click this icon to call up the print plug-in.

In addition to the installation method by each user, the print plug-in 600 can be installed for each user or a team by registering an application or by performing installation setting from an administrator center of the collaboration tool 300.

Collaboration of Print Plugin and Each Service

The collaboration between the print plug-in 600 and various cloud services will be described below.

Since a token is issued if the user is authenticated on the collaboration tool 300, the print plug-in 600 can exchange information in collaboration with various cloud services by using the token.

The cloud storage service 400, the cloud print service 500 and the information managed by the print plug-in will now be described with reference to FIGS. 11A to 11C.

Files stored in the file storage 403 of the cloud storage service 400 includes not only basic information such as file names and file creators, but also includes settings about the sharing and right of access information. The users can set permissions about controlling files and folders for each user or team. The user can also set permissions about reading, writing, downloading, and printing of files. The above information can be changed directly through a Web page of the cloud storage service 400. The above information may be also changed by using a Web API. In addition, the file information, the right of access information, and the setting information about the sharing as shown in FIG. 11A can be acquired by using the Web API.

FIG. 11A is a diagram showing an example of the file information and the right of access information, and the setting information about the sharing regarding files stored in the cloud storage service 400.

Similarly, the user information and the printer information registered in advance are stored in the cloud print service 500.

FIG. 11B is a diagram showing an example of the printer information registered in the cloud print service 500. As shown in FIG. 11B, the cloud print service 500 registers and manages not only data such as printer names, printer IDs, registrants, and states of printers but also information such as the capability of jobs acceptable and operation statuses. The registered information can be changed by accessing the Web page of the cloud print service 500, and the information can be changed and obtained by using the Web API.

Similarly, the operation determining unit 605 of the print plug-in can acquire message information from the chat information management unit 306 by using the Web API.

FIG. 11C is a diagram showing an example of message information managed by the collaboration tool 300. As shown in FIG. 11C, the message information obtained from the collaboration tool 300 holds data such as users who posted messages, their IDs, and reply destination IDs so that the senders of the messages and information of attached files can be seen.

The operation determining unit 605 of the print plug-in service 600 can obtain the relationship between the message posted and other messages based on IDs of the messages, and can collect only file information included in the associated message (e.g., file names and URLs). For example, if the operation determining unit 605 determines that the message calling the plug-in is the head message of a thread, all file information in the thread is collected. If the operation determining unit 605 determines that the message calling the plug-in is a specific message in a thread, only the file information attached to that specific message can be collected. Note that the associated files may be displayed in a list, or only the selected files among the files attached to the selected message may be acquired and displayed in a list.

Generation of Print Setting UI/Reception of Operations

The UIs for performing printing in the print plug-in service 600 called from the collaboration tool 300 are described below.

Figure 8A:
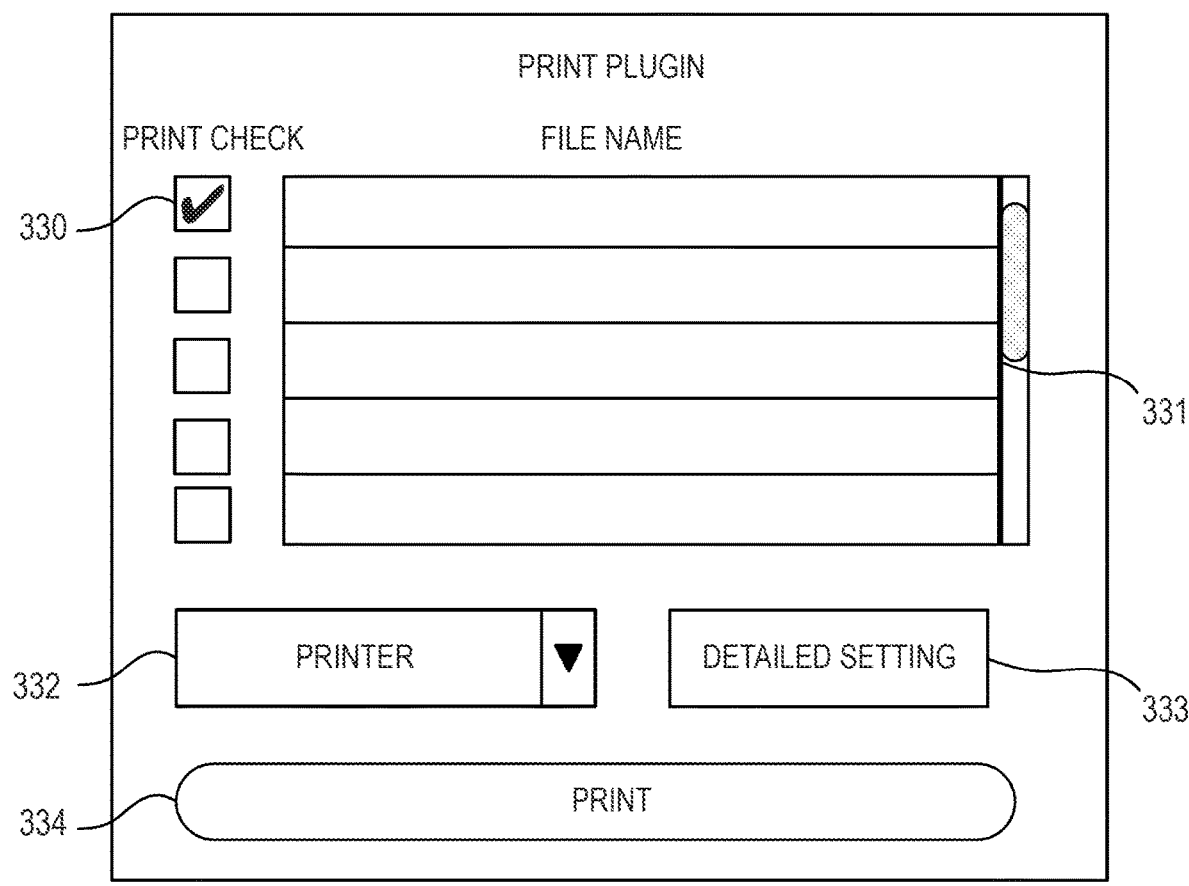
FIG. 8A shows an example of the print setting UI in the print plugin service according to the embodiment of the present disclosure.

The UI generating/operation receiving unit 603 of the print plug-in service 600 generates a print setting UI such as the UI shown in FIG. 8A based on the information acquired by communicating with the cloud print service 500, the cloud storage service 400, and the collaboration tool 300 to receive user's operations.

FIG. 8A is a diagram showing an example of a print setting UI in the print plug-in service 600 according to the present embodiment.

On the print setting UI, a list of file names 331 determined as print objects by the operation determining unit 605 and UIs 330 for selecting print objects are displayed in accordance with the file information. The information of file holders or the like may be displayed in addition to the file names for distinguishing one file from the other files having the same file name. The obtained file information contains information about right of access. If the right of access for the target file is set as not printable, the UI for selecting the target file may be displayed as a gray-out form to be not selectable, or the corresponding UI may not be displayed on the print setting UI. That is, a list of files to be printed is presented on the print setting UI in a selectable manner.

The printer queue information acquired from the cloud print service 500 is displayed as a printer list 332 to receive a selection from the user. The printer queue to be displayed can be limited, and the printers set to be shared among the printer queues registered in the group or tenant to which the user pressing the print button belongs are displayed.

Figure 8B:
FIG. 8B shows an example of the detailed setting UI in the print plugin service according to the embodiment of the present disclosure.

If the UI generating/operation receiving unit 603 detects a press of a detailed setting button 333, the UI generating/operation receiving unit 603 displays a detailed setting UI as shown in FIG. 8B, and updates the text-based detailed setting according to the settings made by the user.

FIG. 8B is a diagram showing an example of the detailed setting UI in the print plug-in service 600 according to the present embodiment. As the detailed setting, only the common detailed setting items of the cloud print may be displayed and selected. Further, the cloud print service 500 may communicate with the printer selected from the printer list 332 to acquire capability information of the printer, and pass the information to the UI generating/operation receiving unit 603 to generate and display detailed settings in accordance with the capability information of the printer.

If a print button 334 is pressed on the print setting UI, the print plug-in service 600 transmits the file to be printed, the detailed settings, the printer queue information, the user information and the like to the cloud print service 500 to execute printing.

Printing from a Thread

Printing from a thread of the collaboration tool 300 will be described below. If the print plug-in 600 is installed in the collaboration tool 300, the UI generating/operation receiving unit 603 provides a UI for using the print function for each message posted to the collaboration tool 300.

FIG. 9A is a diagram showing an example of a UI for calling the print plug-in 600 from the head message of a thread posted to a channel of the collaboration tool 300.

In FIG. 9A, subsequent messages and attachments cannot be checked because they are folded and closed. However, all the files shared to the thread starting from the head message can be obtained and printed together by calling the print plug-in as shown in FIG. 9A.

If the head message of the thread is selected by the user, the collaboration tool 300 displays a three-dot leader 340. If the three-dot leader and "Other Operations" 341 therein are selected by the user, the collaboration tool 300 displays a list of standard functions and added plug-ins including a print plug-in icon 342. If the print plug-in icon 342 is selected by the user, the print plug-in 600 is called out.

The print plug-in 600 exhibits the print settings UI shown in FIG. 8A as a pop-up window. Files to be printed are selected by the user, and the selection is received through the lists 330 and 331. The printer to be used as the output destination is selected by the user, and the selection is received through the printer list 332. If a press of the detailed setting button 333 is detected to perform the detailed setting for the object to be printed, the print plug-in 600 displays the Web UI shown in FIG. 8B to receive the detailed setting from the user. If the print plug-in 600 detects a press of the print button 334 by the user after the setting is completed, the print plug-in 600 transmits a job to the cloud print service 500 and outputs the target object from the designated printer.

Next, an example of calling the print plug-in 600 from a message other than the head message of a thread will be described.

Figure 9B:
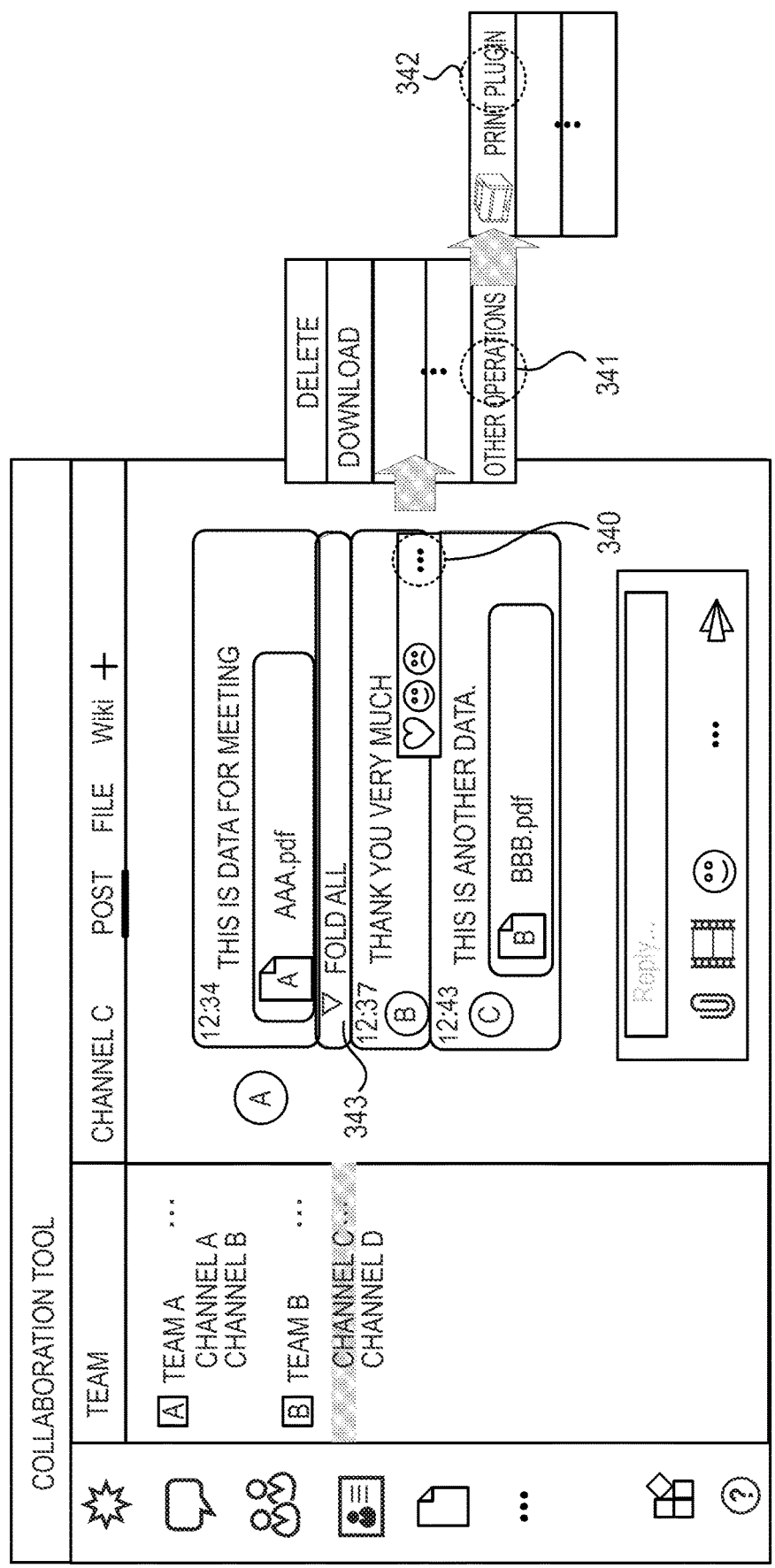
FIG. 9B shows an example of a UI when calling out the print plugin from messages other than the top message of a thread.

FIG. 9B is a diagram showing an example of a UI for calling the print plug-in 600 from a message other than the head message of a thread posted to a channel.

If the user presses an expansion (open) button 343 displayed immediately under the head message, the collaboration tool 300 displays the following reply messages and attached files. If the user searches for the message to which the desired file is attached and selects that message, the user can print the message in the same manner as the case of the print plug-in 600 called from the head message.

The operation of the print plug-in 600 called from the collaboration tool 300 will be described below.

Figure 10A:
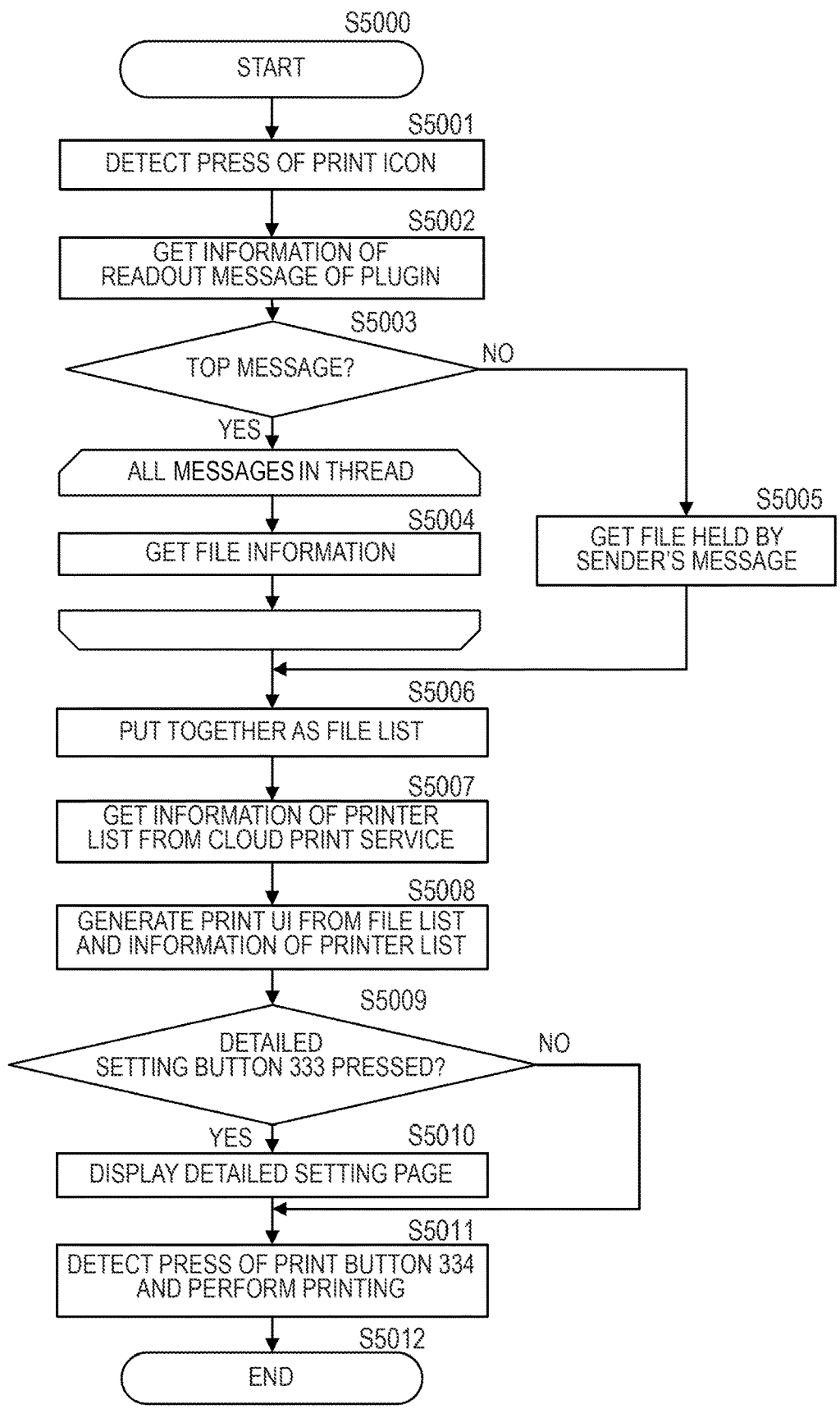
FIG. 10A shows a flowchart describing an example of the process of the print plugin according to the first embodiment.

FIG. 10A is a flowchart showing an example of the process of the print plug-in 600 that is called by pressing the print plug-in icon 342. The process of this flowchart is realized by the CPU of one or more computers mounting the print plug-in service 600 through a program stored in the storage devices read and executed by the CPU.

If the UI generating/operation receiving unit 603 of the print plug-in 600 detects a press of the print plug-in icon 342 (step S5001), the process proceeds to step S5002.

In step S5002, the operation determining unit 605 acquires the information of the message calling the print plug-in 600 (that is, the message associated with the print plug-in icon 342 detected to have been pressed in step S5001) from the chat information management unit 306.

Next, the operation determining unit 605 determines whether or not the message is the head message of a thread based on a reply destination ID (hereafter referred to as the "replyToId") included in the message acquired in step S5002 (step S5003). If the parameter replyToId shown in FIG. 11C does not have a value, the operation determining unit 605 determines that the message is the head message. If the parameter replyToId has a value, the operation determining unit 605 determines that the message is a message other than the head message.

If the message is other than the head message of the thread (No in step S5003), the operation determining unit 605 acquires the file information attached to the message from the "attachments" shown in FIG. 11C (step S5005), and adds the acquired file to a list (S5006).

If the message is the head message of the thread (Yes in step S5003), the operation determining unit 605 confirms messages posted after the head message. The operation determining unit 605 checks the following messages in order if the replyToId of each message matches the ID of the head message until a message having no value as the parameter of the replyToId is found. If the replyToId of the message match the ID of the head message, the operation determining unit 605 checks if the "attachments" of the message shown in FIG. 11C has a value to determine that files are attached to the message. If the "attachments" of the file has a value, the operation determining unit 605 acquires the file information of the "attachments" shown in FIG. 11C (step S5004). Information of the thread may be acquired collectively to distinguish messages and acquire the file information acquisition. The operation determining unit 605 finally arranges the acquired files as a list (step S5006).

Referring to the examples of threads shown in FIGS. 9A and 9B, "AAA.pdf" and "BBB.pdf" are displayed in a list if the head message is the calling source of the plug-in (caller) as shown in FIG. 9A. On the other hand, if a message other than the head message is the caller as shown in FIG. 9B, "BBB.pdf" is displayed in the list, and "AAA.pdf" is not displayed in the list.

The cloud print queue management unit 604 acquires a registered printer list from the cloud print service (step S5007), and the UI generating/operation receiving unit 603 generates the print setting UI and displays the generated print setting UI as a pop-up window on the collaboration tool 300 (step S5008). The contents to be displayed may be restricted based on the file list including information of file names or access authority acquired by the file management unit 601 from the cloud storage service 400. In addition, the contents to be displayed may be restricted to printable files having file types supported by the cloud print queues acquired from the cloud print service 500.

Then, the UI generating/operation receiving unit 603 waits for an operation from the user, and if the UI generating/operation receiving unit 603 detects that the detailed setting button 333 has been pressed (Yes in step S5009), a detailed setting page is displayed (step S5010).

If the UI generating/operation receiving unit 603 detects a press of the print button 334 after all settings are completed, the UI generating/operation receiving unit 603 acquires the selected file information, the printer queue information and text-based detailed setting information. The file management unit 601 acquires the file from the file storage 403 by using the token information based on the file information selected by the user. Further, the data input unit 602 transmits the shaped file data and the detailed settings to the selected queue on the cloud print service 500 to execute printing (step S5011).

As described above, the target file can be printed according to the calling source (caller) of the print plug-in, and multiple files hidden in a thread can be extracted and selected as the printing target without any trouble. As a result, the present invention allows the users to reduce time and steps required to print files shared on the collaboration tool.

In the above process, if the message as the caller of the print plug-in is the head message of a thread, the files attached to all the messages of the thread is displayed in the list. If the message as the caller of the print plug-in is not the head message of the thread, the file attached to that message is displayed in the list.

However, if the message as the caller of the print plug-in is not the head message of the thread, files attached to all messages of the thread including that message may be displayed in the list like the case of the head message being the caller. In this case, the files attached to the message of the caller of the print plug-in may be displayed as selected (checks already inputted) in the UI 330 for selecting the print targets when displaying the file list 331.

Referring to the example of threads shown in FIGS. 9A and 9B, if the head message is the caller as shown in FIG. 9A, "AAA.pdf" and "BBB.pdf" are included in the list, and only "AAA.pdf" is selected when displaying a list of files. On the other hand, if a message other than the head message is the caller as shown in FIG. 9B, "AAA.pdf" and "BBB.pdf" are included in the list, and only "BBB.pdf" is selected when displaying the list of files.

If a message other than the head message of the thread is the caller, the files attached to that message and the reply messages to that message may be displayed in the list. For example, messages posted after the message of the calling source of the print plug-in are checked to confirm in order if the replyToId of each message matches the ID of the above calling source until a message having no value in the parameter "replyToId" is found. If the replyToId of the message match the ID of the head message, the operation determining unit checks if the "attachments" of each message shown in FIG. 11C has a value to determine that files are attached to the messages. If the "attachments" of the file has a value, the operation determining unit acquires the file information of the "attachments" shown in FIG. 11C, and adds the information to the list.

As described above, according to the first embodiment, files shared on the collaboration tool can be selected and printed without any trouble.

Second Embodiment

Printing from List of Files

Depending on the collaboration tools 300, the print plug-in 600 may be called from a three-dot leader associated with a file. The embodiment for such a case will be described below. In this case, if the print plug-in 600 is installed in the collaboration tool 300, an icon for the print plug-in is added in a three-dot leader associated with files attached to a message or associated with files listed by a filing function of the collaboration tool 300. For example, user interfaces 344 to 346 for the above case is shown in FIG. 9C.

Figure 9C:
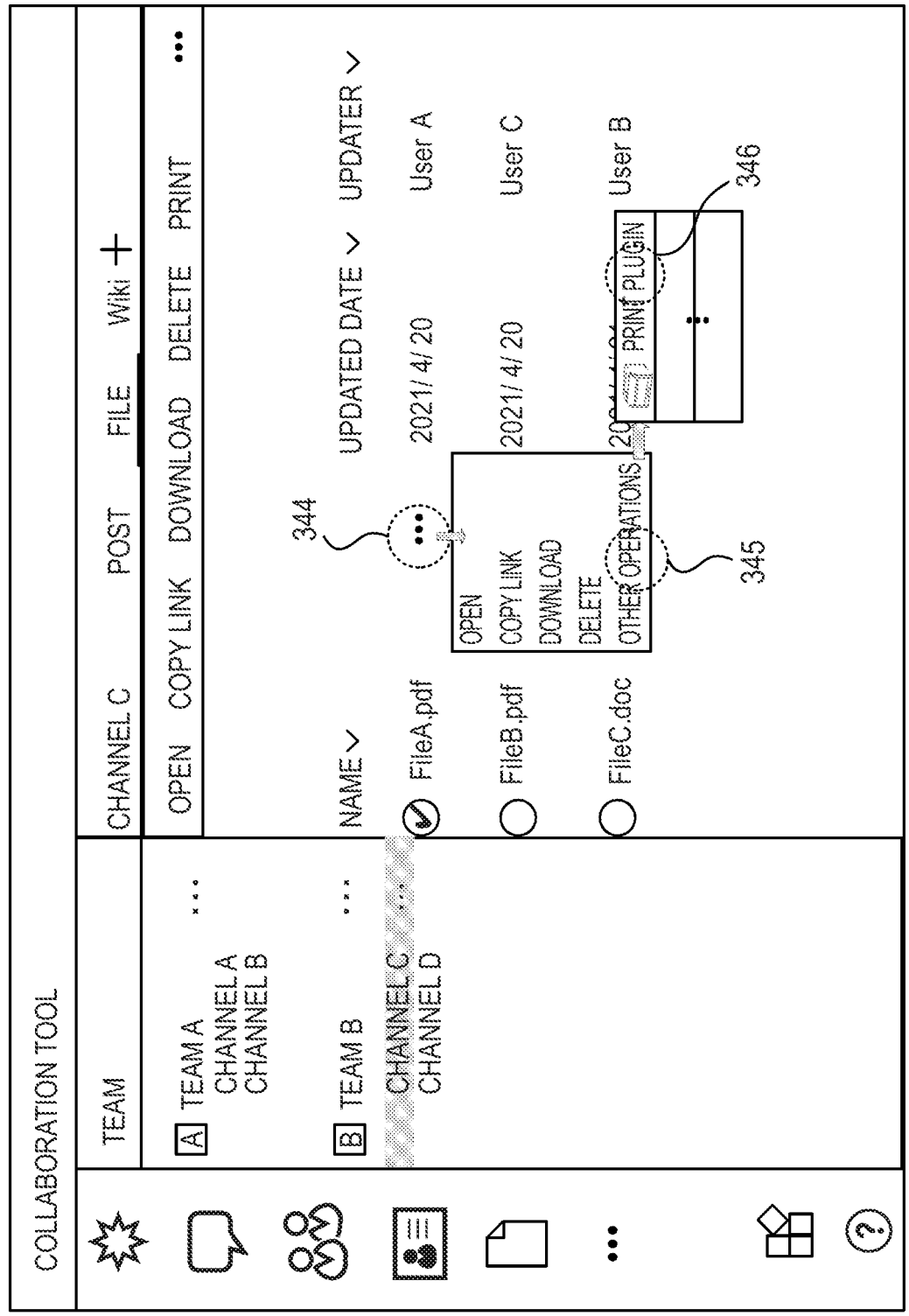
FIG. 9C shows an example of a UI when calling out the print plugin from a list of files.

FIG. 9C is a diagram showing an example of a UI for calling the print plug-in 600 from a three-dot leader connected to files displayed in the file list of the collaboration tool 300.

In the second embodiment, the operation determining unit 605 of the print plug-in 600 determines that the print plug-in 600 is called from the three-dot leader of the file list, and then the printing operation is executed. The operation of the print plug-in 600 until the completion of printing will be described with reference to FIG. 10B.

Figure 10B:
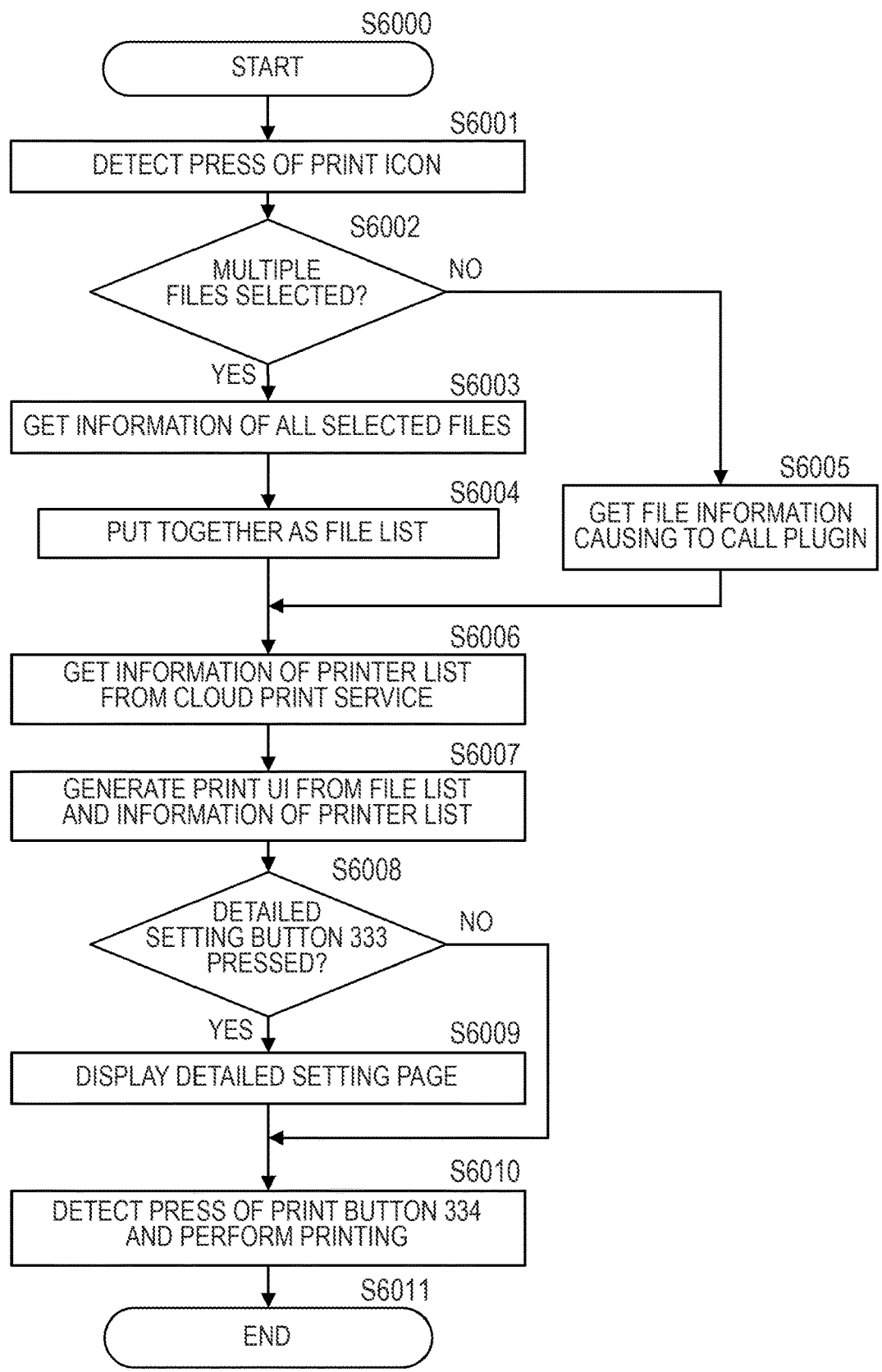
FIG. 10B shows a flowchart describing an example of the process of the print plugin according to the second embodiment.

FIG. 10B is a flowchart showing an example of the process of the print plug-in 600 according to the second embodiment. The process of this flowchart is realized by the CPU of one or more computers mounting the print plug-in service 600 through a program stored in the storage devices read and executed by the CPU.

If the UI generating/operation receiving unit 603 of the print plug-in 600 detects a press of a print plug-in icon 346 (step S6001), the process proceeds to step S6002.

In step S6002, the operation determining unit 605 acquires file information shared on the collaboration tool 300. Depending on the calling sources of the print plug-in 600 and the UI configuration of the collaboration tool 300, files to be acquired may be changed to only the file of the calling source or to multiple files selected through the UI.

Next, the operation determining unit 605 determines whether or not multiple files are to be printed based on a number of file information acquired in step S6002 (step S6002).

If the operation determining unit 605 determines that multiple files are to be printed (Yes in step S6002), the operation determining unit 605 acquires all the information of the multiple files to be printed (step S6003) to add the information to a list (step S6004).

If the operation determining unit 605 determines that only a single file (the file attached to the caller) is a file to be printed (No in step S6002), information of the file attached to the message of the calling source is acquired to add to the list (step S6005).

If the file information acquired from the collaboration tool 300 contains a parameter indicating a selected state in addition to parameters such as file names, update date and time, and URLs, the operation determining unit 605 may determine whether the file is a file to be printed based on the parameter of the selected state. If the print plug-in 600 acquires the file information and finds that the file information contains the parameter of the selected state, the operation determining unit 605 determines whether multiple files are selected based on the parameter of the selection state of each file. In this case, with reference to the example shown in FIG. 9C, only the first file "FileA.pdf" is displayed in the list if the first file is the calling source and no check is inputted for other files as shown in FIG. 9C.

The cloud print queue management unit 604 acquires a registered printer list from the cloud print service (step S6006), and the UI generating/operation receiving unit 603 generates a print setting UI and displays the generated print setting UI as a pop-up window on a collaboration tool 300 (step S6007). The contents to be displayed may be restricted based on the file list including information of file names or access authority acquired by the file management unit 601 from the cloud storage service 400. In addition, the contents to be displayed may be restricted to printable files having file types supported by the cloud print queues acquired from the cloud print service 500.

Then, the UI generating/operation receiving unit 603 waits for an operation from the user, and if the UI generating/operation receiving unit 603 detects that the detailed setting button 333 has been pressed (Yes in step S6008), the detailed setting page is displayed (step S6009).

If the UI generating/operation receiving unit 603 detects a press of the print button 334 after all settings are completed, the UI generating/operation receiving unit 603 acquires the selected file information, the printer queue information and the text-based detailed setting information. The file management unit 601 acquires the file from the file storage 403 by using the token information based on the file information selected by the user. Further, the data input unit 602 transmits the shaped file data and the detailed settings to the selected queue on the cloud print service 500 to execute printing (step S6010).

As described above, the present invention allows the users to reduce time and steps required to print files from a list of files provided by the collaboration tool.

In each of the above embodiments, the configuration in which the print plug-in service 600 is installed as a plug-in in the collaboration tool 300 and a printing function is added to the collaboration tool has been described. However, the functions of the print plug-in service 600 described above may be initially comprised by the collaboration tool 300.

As described above, the respective embodiments allow to select and print files shared on the collaboration tool without any trouble. As a result, if the print plug-in is called from a posting screen such as a chat service, not only files attached to the message as the calling source of the print plug-in but also files attached to the reply messages can be displayed in a list as files to be printed. Therefore, the user can easily print not only the file attached to the message as the calling source of the print plug-in but also the files attached to the reply messages without any trouble.

The structure and contents of the various data described above are not limited to the above embodiments, and these structure and contents may be configured in different manners and types depending on the use and purpose.

Although two embodiments have been described above, the present invention may be implemented as, for example, a system, apparatus, method, program, storage medium, or the like. Specifically, the present invention may be applied to a system comprising multiple apparatuses, or may be applied to an apparatus consisting of a single device.

All of the configurations combining the above embodiments are also included in the scope of the present invention.

The present invention is not limited to the above-described embodiments, and various modifications (including organic combinations of the respective embodiments) are applicable based on the concept of the present invention, and these modifications are not excluded from the scope of the present invention. That is, all the configurations combining the above-described embodiments and modifications thereof are also included in the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-140589 filed Aug. 31, 2021, which is hereby incorporated by reference herein in its entirety.

What is claimed is:

1. An information processing apparatus comprising:
a controller configured to:
 transmit a posting;
 display the transmitted posting;
 display information of data linked to other posting as responses to the transmitted posting;
 receive a user operation to specify a print function through an object displayed in association with the transmitted posting;
 display information of the data linked to the other posting associated with the posting as selectable data to be printed; and
 transmit a print instruction based on information of the displayed data that is selected through a user operation.

2. The information processing apparatus according to claim 1, wherein, if other data is added to the posting, the controller displays information of the other data as selectable data with the information of the data.

3. The information processing apparatus according to claim 1, wherein the data is a file.

4. The information processing apparatus according to claim 1, wherein the controller receives an operation to set a print setting value for printing the data selected based on the user operation.

5. The information processing apparatus according to claim 1, wherein the controller receives other user operation to select a printing apparatus used for printing the data selected based on the user operation.

6. A server system communicable with a chat server that provides a chat function for an information processing apparatus, the server system comprising:
a first receiving unit that receives, from the chat server, a notification indicating that an object corresponding to a posting displayed in the information processing apparatus has been selected;
a display controlling unit that causes the information processing apparatus to display, based on the received notification, information of data linked to other posting associated with the posting as information of printable data;
a second receiving unit that receives a print instruction of the data corresponding to the displayed information; and
a transmitting unit that transmits the data based on the print instruction.

7. The server system according to claim 6, wherein the display controlling unit causes the information processing apparatus to display an object to receive a print setting value used for printing the data.

8. The server system according to claim 6, wherein the display controlling unit causes the information processing apparatus to display an object to select a print apparatus used for printing the data.

9. The server system according to claim 6, wherein, if other data is linked to the posting, the display controlling unit causes the information processing apparatus to display information of the data and information of the other data as information of printable data.

10. The server system according to claim 6, wherein the display controlling unit causes the information processing apparatus to display information of data linked to the other posting associated with the posting based on the fact that the notification does not contain information indicating that the posting is a response to any other posting.

11. The server system according to claim 10, wherein, if receiving a user operation to specify a print function from an object corresponding to a response to any posting, the display controlling unit causes the information processing apparatus to display data linked to the response as selectable data to be printed, and not to display other data linked to other posting associated with the response as data to be printed.

12. A method of controlling a server system communicable with a chat server that provides a chat function for an information processing apparatus, the method comprising the steps of:
  first receiving that receives, from the chat server, a notification indicating that an object corresponding to a posting displayed in the information processing apparatus has been selected;
  display controlling that causes the information processing apparatus to display, based on the received notification, information of data linked to other posting associated with the posting as information of printable data;
  second receiving that receives an instruction for the information processing apparatus to print the data corresponding to the displayed information; and
  transmitting that transmits the data based on the instruction.

13. The method according to claim 12 further comprising the step of causing the information processing apparatus to display an object to receive a print setting value used for printing the data.

14. The method according to claim 12 further comprising the step of causing the information processing apparatus to display an object to select a print apparatus used for printing the data.

15. A non-transitory storage medium storing a program that causes a computer to execute the steps of:
  first receiving that receives a notification indicating that an object corresponding to a posting displayed in an information processing apparatus has been selected;
  display controlling that causes the information processing apparatus to display, based on the received notification, information of data linked to other posting associated with the posting as information of printable data;
  second receiving that receives an instruction for the information processing apparatus to print the data corresponding to the displayed information; and
  transmitting that transmits the data in response to receiving an instruction for the information processing apparatus to print the data.

16. The non-transitory storage medium according to claim 15, wherein the program further causes the computer to execute the step of causing the information processing apparatus to display an object to receive a print setting value used for printing the data.

17. The non-transitory storage medium according to claim 15, wherein the program further causes the computer to execute the step of causing the information processing apparatus to display an object to select a print apparatus used for printing the data.

* * * * *